United States Patent [19]

Kozierok et al.

[11] Patent Number: 4,676,742

[45] Date of Patent: Jun. 30, 1987

[54] PREHEATER FOR REVERBERATORY MELTING FURNACES

[75] Inventors: Leon Kozierok; Robert Gallagher, both of Weston, Canada

[73] Assignee: Indalloy Division of Indal Limited, North York, Canada

[21] Appl. No.: 705,214

[22] Filed: Feb. 25, 1985

[51] Int. Cl.$^4$ .......................... F27B 9/00; C21C 5/00
[52] U.S. Cl. ................................... 432/143; 266/901; 406/88; 432/152; 432/168; 432/192
[58] Field of Search ............... 432/58, 143, 152, 153, 432/168, 176, 192; 266/901; 406/88, 90

[56] References Cited

U.S. PATENT DOCUMENTS

| | | | |
|---|---|---|---|
| 1,844,635 | 2/1932 | Coller | 406/88 |
| 2,624,565 | 1/1953 | Kompart | 266/901 |
| 2,805,898 | 9/1957 | Willis, Jr. | 406/88 |
| 2,848,820 | 8/1958 | Wallin et al. | 406/88 |
| 2,882,097 | 4/1959 | Hamren | 406/88 |
| 3,583,077 | 6/1971 | Vian-Ortuno et al. | 406/88 |
| 3,647,266 | 3/1972 | Hurd et al. | 406/88 |
| 3,758,267 | 9/1973 | Berk | 266/901 |
| 3,855,950 | 12/1974 | Hughes, Jr. | 110/186 |
| 3,985,497 | 10/1976 | Fellnor et al. | 432/192 |
| 4,411,674 | 10/1983 | Forgac | 406/94 |
| 4,445,849 | 5/1984 | Bouille | 266/901 |
| 4,504,177 | 3/1985 | Lagneau | 406/88 |

Primary Examiner—Henry C. Yuen
Attorney, Agent, or Firm—James D. Fornari

[57] ABSTRACT

An improved preheater is provided suitable for use with gas or oil fired reverberatory melting furnaces for recycling aluminum scrap and other scrap metals. The improved preheater comprises a charge box having a bottom, and a chamber having a bed. The chamber is in communication with the charge box at one end, and, an exit at the other. A pusher is provided for pushing the contents of the charge box into the chamber and thus pushing the contents of the chamber towards the exit. The chamber is of uniform expanding dimensions from its one end in communication with the charge box towards the exit. The bed of the chamber carries openings therethrough from a gas chamber therebelow into which heated waste gas is passed for circulation through the openings in the bed through the contents of the chamber.

9 Claims, 16 Drawing Figures

PREHEATER FOR REVERBERATORY MELTING FURNACES

FIELD OF INVENTION

This invention relates to an improved preheater suitable for use with gas fired reverberatory melting furnaces for recycling aluminum scrap and other scrap metals.

BACKGROUND OF INVENTION

Preheating of aluminum scrap prior to being fed into a gas or oil fired reverberatory furnace for processing is known to drive off moisture carried on the scrap. If the water is not driven off, explosive vaporization can occur when the scrap is introduced into the furnace. Such preheating also reduces the cost of processing of the metal by raising the temperature of the metal before its being introduced into the furnace.

In previous proposals, cold scrap was placed on a sill surrounding the well of the reverberatory furnace which carried the molten metal, before being pushed into the well to preheat the scrap and drive off the water. In some instances, a carriage was pushed into a position near the mouth of the furnace at the level of the sill to preheat the scrap on the carriage before being pushed onto the sill for more heating before introduction into the well.

In another proposal, scrap iron is pushed by pushers from step to step in a preheat area of a furnace before discharge into the furnace hearth (see Canadian Letters Pat. No. 645,586).

In more recent proposals, preheating of scrap aluminum has been accomplished by applying heat generated by special burners or waste heat carried by the flue gases discharged up the stack. In U.S. Pat. No. 3,669,436, scrap metal carried in a container is preheated at a preheating station by waste gases passed through the bottom of the container up through the scrap. Thereafter, the contained scrap is discharged into the furnace. Of course, it will be appreciated that such a proposal is costly (particularly for the amount of material that can be preheated) and complex. U.S. Pat. No. 3,424,445 discloses another approach where containers carrying scrap metal are moved on trucks in a gas tunnel carrying waste gases.

In more recent proposals, a rotary kiln has been used because of, its compact size, adaptability to high capacity processing (unlike the proposals previously discussed) and, capability of achieving uniform heating of the aluminum scrap. However, rotary kiln applications are limited to smaller sized scrap (for example, chopped, crushed or shredded). Therefore the scrap (unless of small size) before preheating in the rotary kiln, must be shredded, comminuted or chopped into smaller pieces. If the aluminum scrap for example is merely compressed, water may be trapped and/or the metal scrap will not be preheated thoroughly. Furthermore, where the scrap must first be shredded, chopped or otherwise comminuted, the preliminary processing requires the expenditure of additional energy and which processing results in about 1% -2% loss of metal. In preheating the small sized scrap metal in the rotary kiln, the kiln lifts and tumbles the scrap as flue gases are passed over and around the metal pieces.

In another proposal, small pieces of scrap metal (shredded cans, borings, turnings, extrusions, plates and small castings) are preheated also by the use of waste heat. In this proposal the preheater comprises a downwardly inclined chamber having an inclined bed of overlying spaced plates on the bottom thereof permitting flue gases to be passed into the hopper through the spaced plates to engage the pieces of scrap metal passing down through the inclined chamber to preheat the scrap metal. The preheated metal is discharged at a controlled flow rate (controlled by vibratory discharge) through an inclined discharge chute. The additional drawbacks with this process (over and above those previously described) include the jamming of the scrap metal in the chamber and the compaction of the small pieces of metal in the chamber as they pass through the chamber so that the flue gases do not touch all the scrap metal to fully preheat it.

Thus it is apparent that not one apparatus has been proposed which preheats large pieces of aluminum scrap metal without first requiring the cutting up of the large pieces or being cost prohibitive before processing in the reverberatory furnace.

Where compacted bundles of large pieces of aluminum scrap metal are brought in for processing into aluminum billets, they must be dealt with in such a way that no water is inadvertently introduced to the reverberatory furnace. To ensure water is eliminated, preheating is desireable. However, the preheating must be done at minimum cost with maximum efficiency.

It is therefore an object of this invention to provide an improved preheater especially suitable for preheating large irregular pieces of aluminum scrap metal.

It is a further object of this invention to provide such improved preheater which is efficient and entirely reliable yet of minimal cost and of minimum complexity.

Further and other objects of the invention will be realized by those skilled in the art from the following summary of the invention and detailed description of embodiments thereof.

SUMMARY OF THE INVENTION

According to one aspect of the invention, an improved preheater suitable for processing large pieces of scrap metal including large pieces of aluminum scrap metal, prior to being charged into a reverberatory furnace is provided, the preheater comprising, a charge box having a bottom for receiving scrap metal, a chamber (having a bed or bottom), the chamber in communication with the charge box at one end and an exit at the other, a ram or pusher for pushing the contents of the charge box into the chamber and thus pushing the contents of the chamber towards the exit, the chamber of uniform expanding dimensions (preferably in both height and width where the chamber is rectangular in cross-section and preferably radially where the chamber is partially circular in cross-section) from its one end in communication with the charge box towards the exit so as to permit the pushing of the scrap metal (for example aluminum scrap metal) in the one direction away from the charge box to the exit without undue compression of the scrap metal or jamming of the scrap metal in the chamber, the chamber having a plurality of openings thereinto (preferably through the bed or bottom of the chamber) for passing heated gases thereinto (in one embodiment, waste gases discharged by a gas fired reverberatory furnace) for preheating the scrap. In one embodiment the bed of the chamber is inclined slightly upwardly from the charge box to the exit. In another embodiment the bed of the chamber is inclined slightly downwardly from the charge box to the exit and the bed carries a drain channel between the charge box and exit proximate the exit for drainage of any water falling from the scrap to the bed of the chamber.

In another embodiment the bed comprises a plurality of laterally extending plates one in front of another, each plate having a front edge closer the exit and a rear edge closer the charge box, the front edge of the plate immediately behind the plate closer the exit, overlying the rear edge of the plate closer the exit and vertically spaced therefrom to provide a plurality of laterally extending openings through the bed.

In one embodiment the plates are 6 inches (about 15.2 cm) in length from front to back and inclined upwardly in the bed so that a 1 inch rise (2.54 cm) is provided over the length of the plate (the bed is also inclined upwardly). The chamber is 6 inches (15.2 cm) wider and 6 inches (15.2 cm) higher at the exit end than the end proximate the charge box. At the charge box the dimensions of the chamber are 4 feet 6 inches (137 cm) wide (the bed) and 4 feet (122 cm) high. The chamber (in this embodiment) is 12 feet, 4 inches (376 cm) long.

Where the gases are injected through the bed, a gas chamber is provided below the bed for receiving the heated gases prior to their passage through the openings.

With the above apparatus, compacting of the metal (which expands as it is heated) and jamming are both minimized as the metal is moved through the chamber thereby maximizing passage of the heated gases through the scrap metal. Therefore, maximum removal of water from the scrap metal takes place all at minimum cost.

As is apparent, the openings in the chamber through which the heated gases are injected into the chamber must be smaller than the pieces of metal so that the metal will not poke through an opening and become caught or fall through.

BRIEF DESCRIPTION OF THE DRAWINGS

The invention will now be illustrated with reference to embodiments of the invention disclosed in the accompanying drawings in which.

DETAILED DESCRIPTION OF THE EMBODIMENTS

Figure 1:
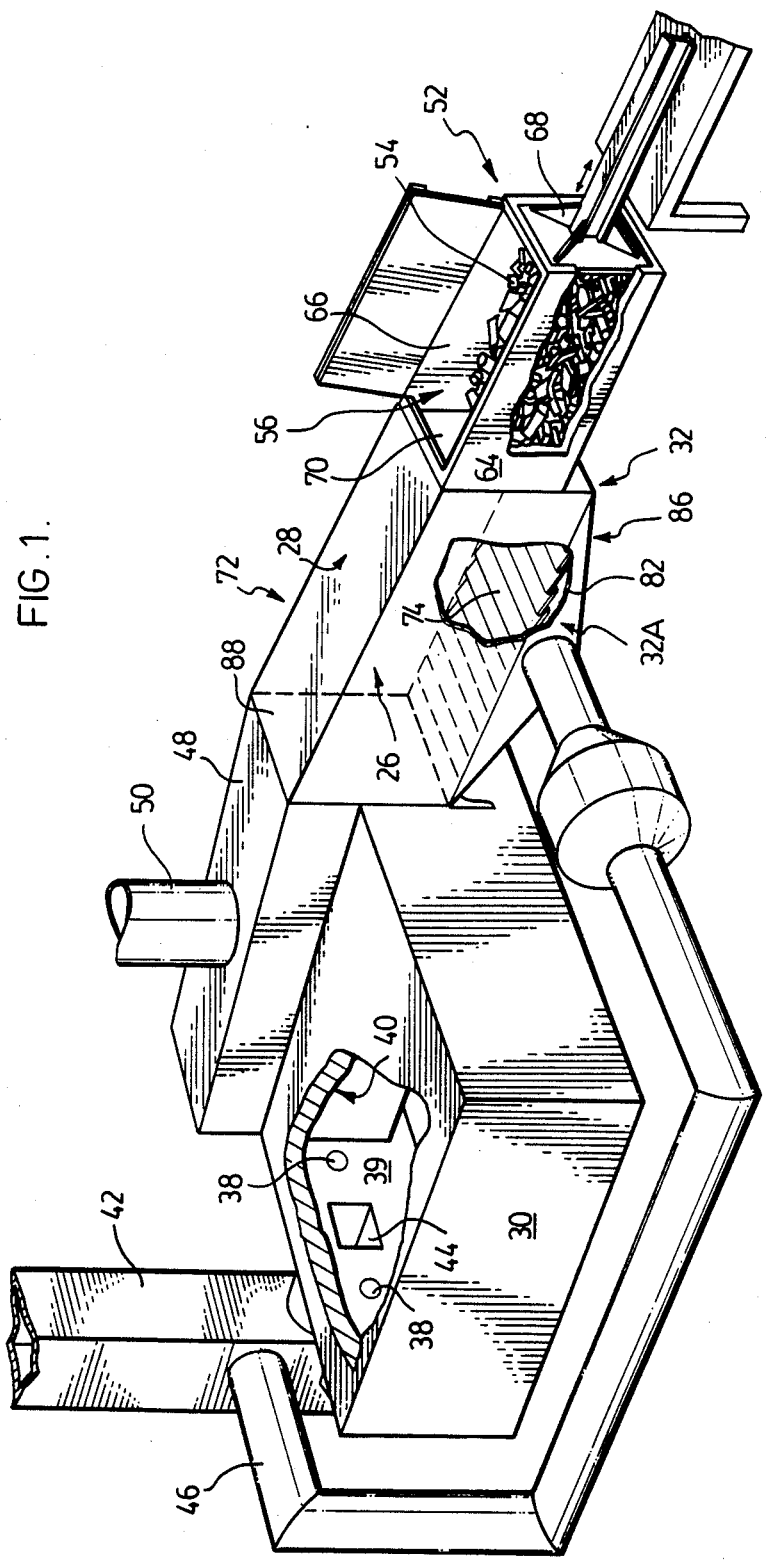
FIG. 1 is a perspective view of a preheater and gas fired reverberatory furnace with portions removed, with the preheater constructed according to a preferred embodiment of the invention.
Figure 2:
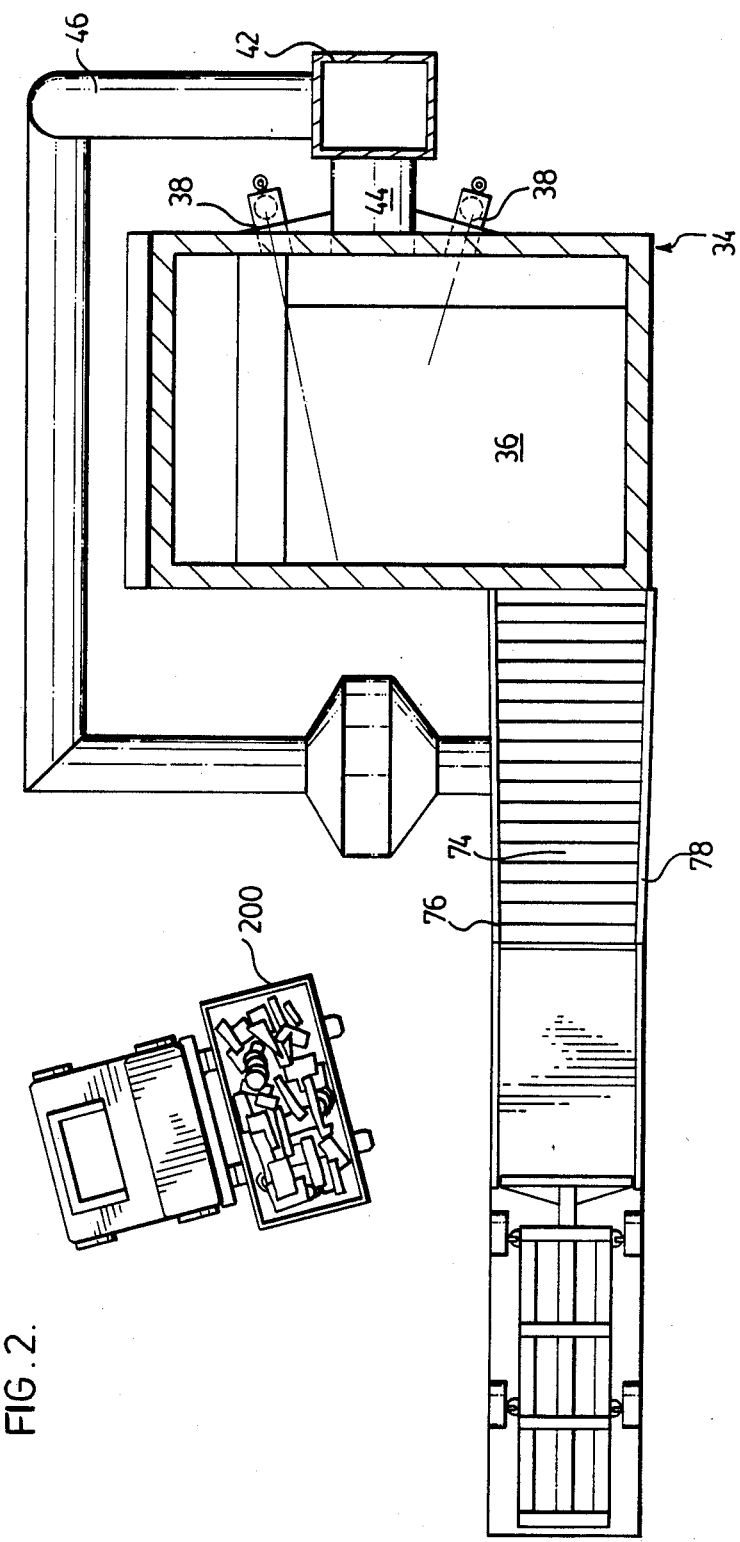
FIG. 2 is a top plan view of the structure shown in FIG. 1.
Figure 3:
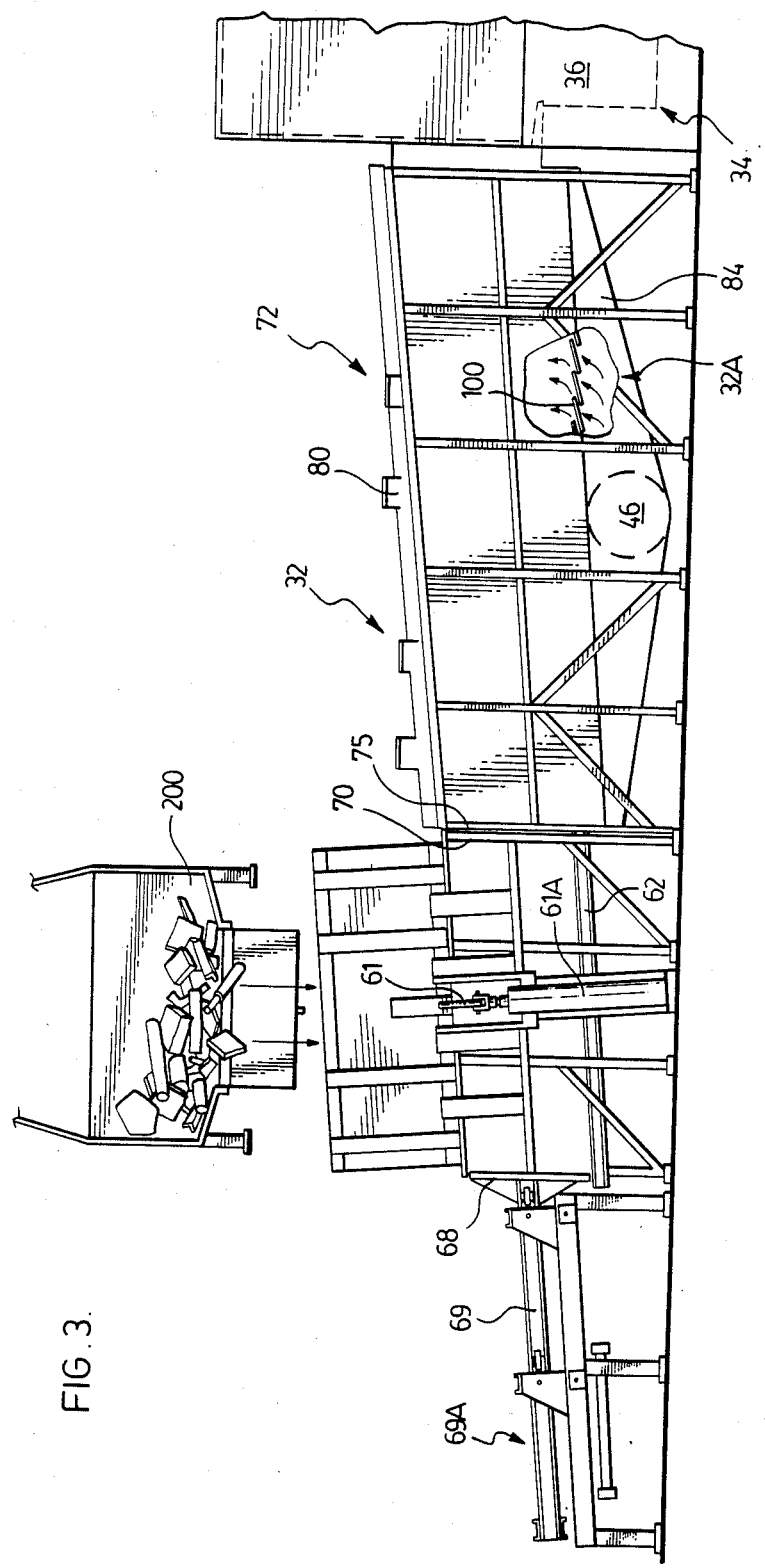
FIG. 3 is a side view of the preheater in FIG. 1 (with a portion removed).
Figure 4:
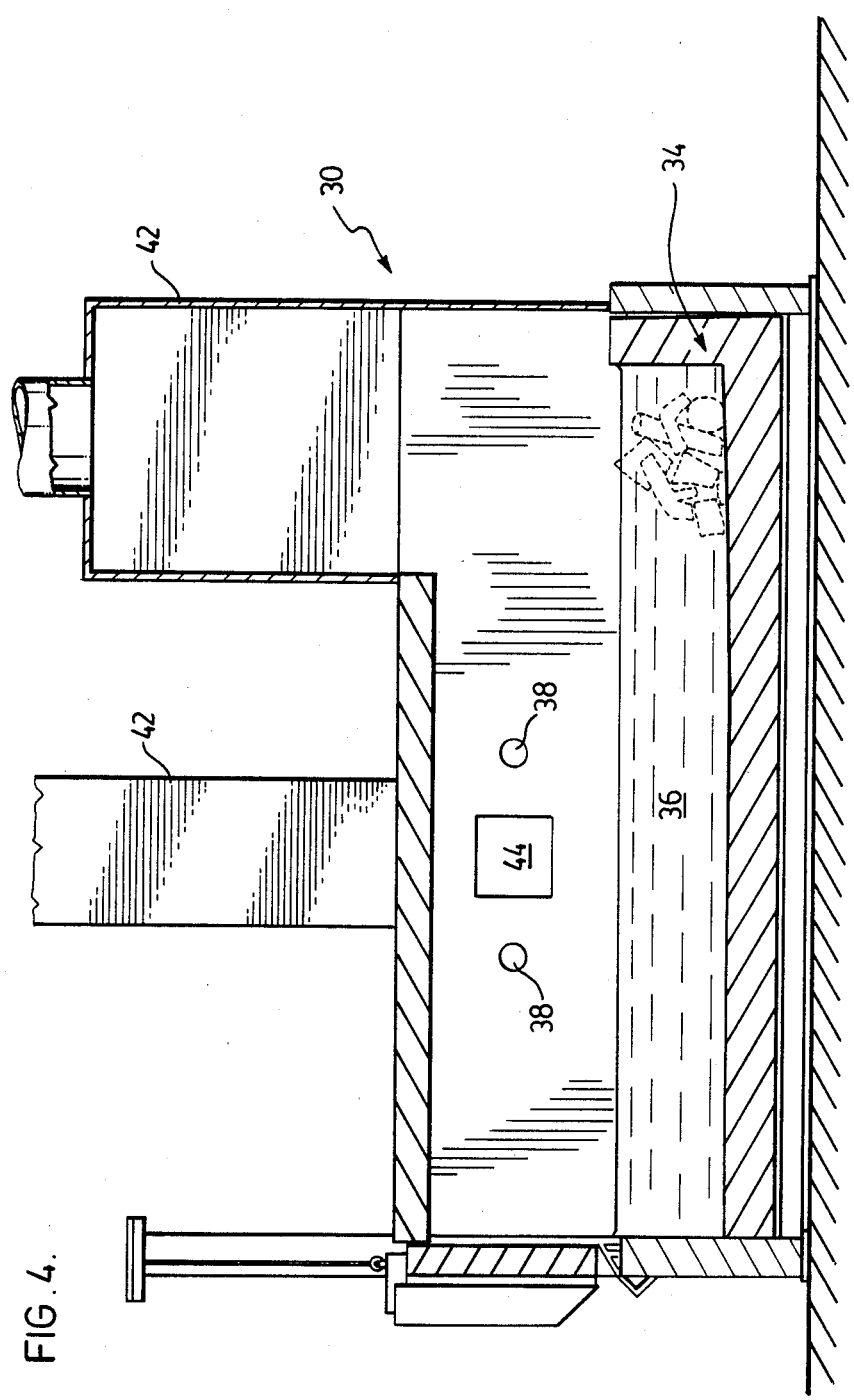
FIG. 4 is a side sectional view of the reverberatory furnace shown in FIGS. 1 and 2.

With reference to FIGS. 1, 2, 3, and 4, there is shown gas fired reverberatory furnaces 30 and preheater 32 for preheating aluminum scrap metal before introducing the metal into the furnace 30.

Reverberatory furnace 30 comprises a well 34 (see FIG. 4) for carrying a molten metal pool of aluminum metal 36. The pool 36 is heated by gas fired burners 38 supported in the walls 39 of the furnace 30 which burners 38 heat the environment over the pool below the roof 40 of the furnace. Much of the generated heat is radiated into the well 34. A large amount of the heat generated is lost up the stack 42 through exhaust outlet 44. Some of the exhaust gases is taken off through tubing 46 and injected into lower portion or lower chamber 32A of preheater 32. The roof 40 of furnace 30 does not extend entirely over well 34. Therefore, well 34 comprises a portion not covered by roof 40 supported by walls 39. That portion is covered by hood 48 from which extends exhaust stack 50.

Figure 5:
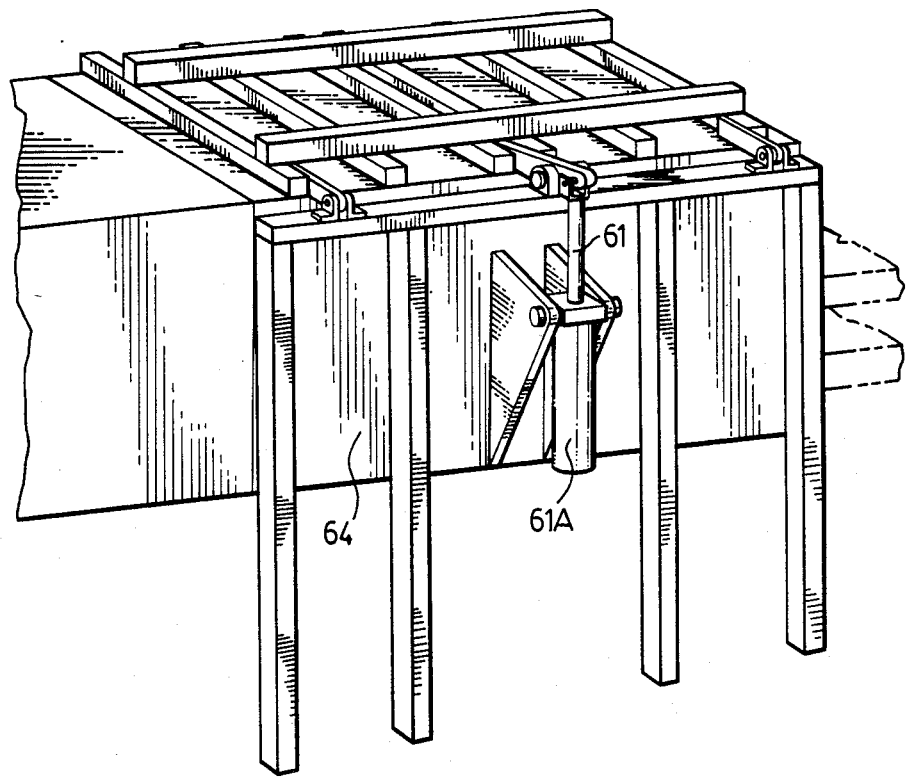
FIG. 5 is a close-up view of part of the structure shown in FIG. 1.
Figure 6:
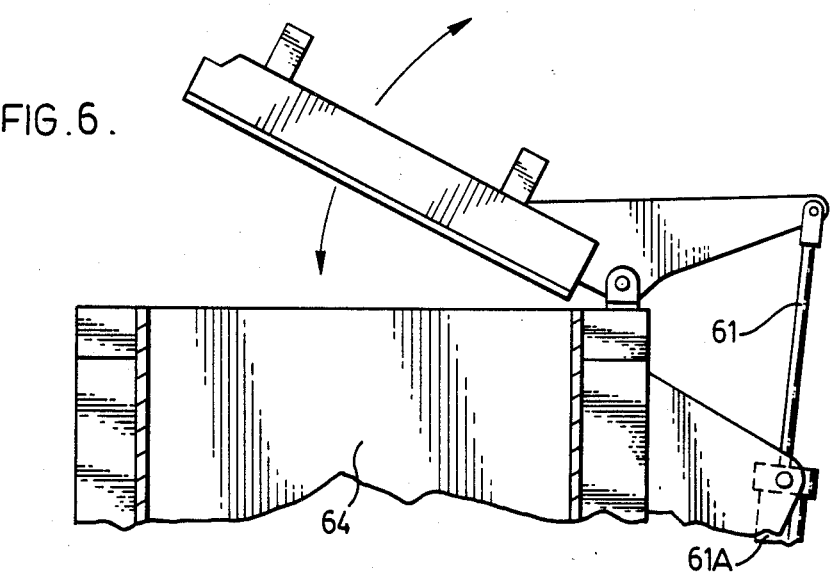
FIG. 6 is a side view of part of the structure shown in FIG. 5 and its operation.
Figure 7:
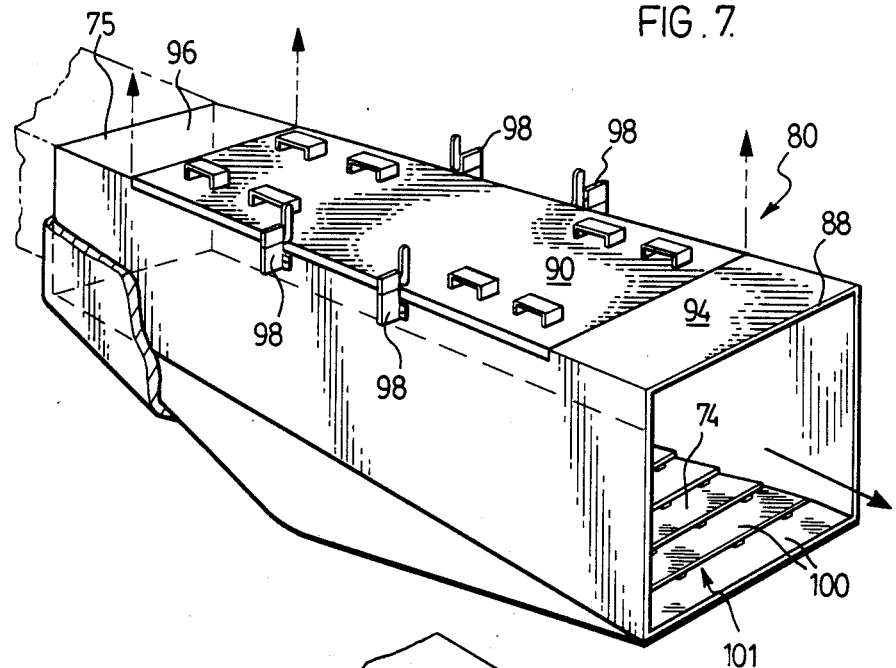
FIG. 7 is an end perspective view of the chamber of the preheater shown in FIG. 1.
Figure 8:
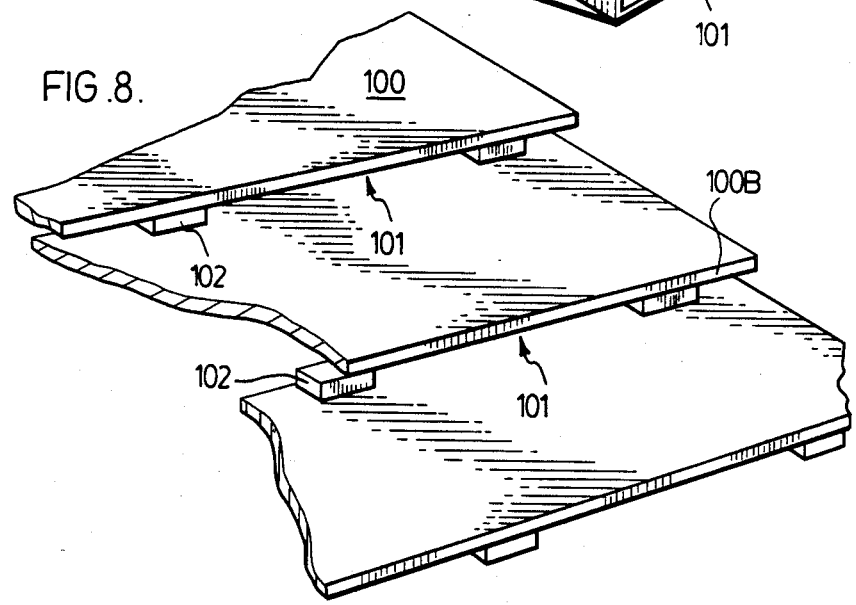
FIG. 8 is a close-up view of the bed of the chamber shown in FIG. 7.

Preheater 32 comprises charge box 52 (10 feet, 7 inches in length [322.6 cm]) for receiving aluminum scrap metal 54 (see FIG. 1) through the top opening 56 closed by pivotable top 58 hinged at 60 (see FIG. 5) and pivoted by rod 61 as it moves into and out of hydraulic cylinder 61A to pivotably open or close top opening 56 at about hinges 60. Charge box 52 comprises flat unperforated bottom 62 (see FIG. 3) and upstanding side walls 64 and 66. Hydraulically operated pusher or ram 68 is disposed at one end of charge box 52 closing that end and reciprocal from that end into the volume of the charge box. Therefore, pusher 68 substantially fills the cross-sectional area of charge box 52. Pusher 68 is secured by I-beam 69 to hydraulic cylinder [Vickers Hydraulic Power Unit (maximum 2,000 p.s.i.)] at 69A to be reciprocated thereby. Together pusher 68 and cylinder 69A occupy 12 feet in length. As pusher 68 advances into charge box 52 it pushes the contents out end 70 into enclosed chamber 72 through opening 75. Chamber 72 (12 feet 4 inches in length [375.9 cm]) comprises bed 74, side walls 76 and 78 and top 80. Bed 74 surmounts lower chamber 32A, V-shaped in cross-section, looking in from tubing 46 (see FIGS. 1 and 3). Chamber 32A comprises upstanding V-shaped side walls 82 (see FIG. 1) and 84 (see FIG. 3) and V-shaped bottom 86 (see FIG. 1). Chamber 72 is of expanding dimensions in both height and width as chamber 72 extends from opening 75 to exit 88. Side walls 76 and 78 increase uniformly in height by 6 inches from opening 75 to exit 88 and bed 74 increases uniformly in width by 6 inches (15.2 cm) from opening 75 to exit 88. Bed 74 is 4 feet 6 inches (137 cm) wide at opening 70. Walls 76 and 78 are 4 feet (122 cm) high at opening 75. Top 80 comprises removeable plate 90 (see FIG. 7) carrying brackets 92 welded thereto for assisting to remove plate 90 [by for example receiving forks of a fork lift (not shown)]. Plate 90 sits on top of side walls 76 and 78 and between fixed rectangular end portions 94 and 96. Plate 90 is removeably secured in position by clamping means 98 fixed to the top of side walls 76 and 78.

Figure 9:
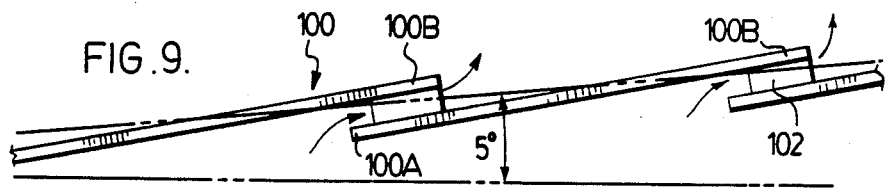
FIG. 9 is a side view of the bed shown in FIG. 8.
Figure 10:
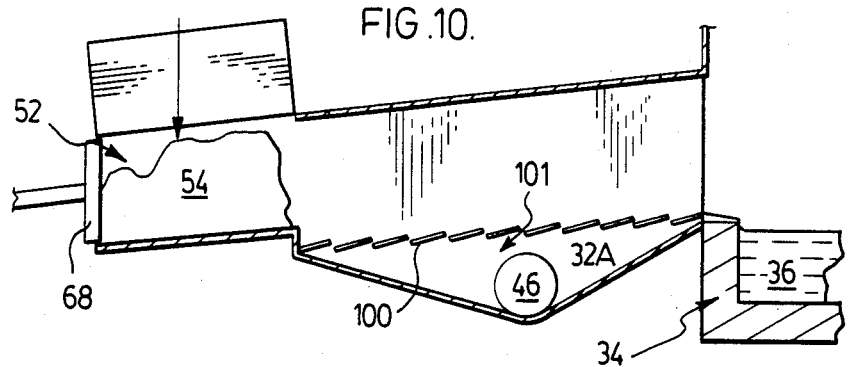
FIGS. 10 through 13 inclusive illustrate the use of the preheater shown in the previous drawings.
Figure 11:
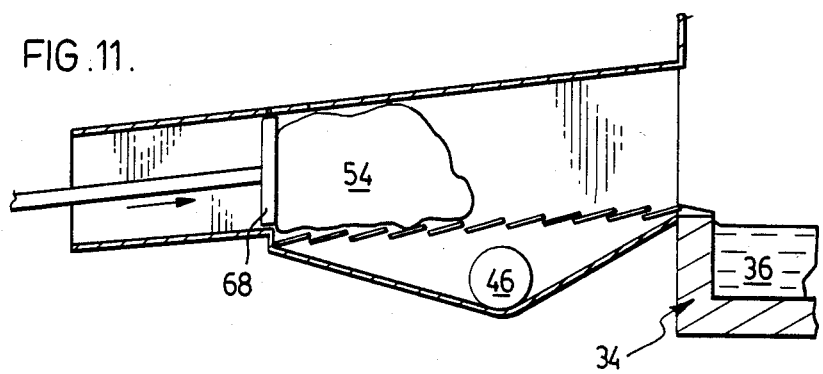

Bed 74 is inclined upwardly from opening 75 to exit 88 at an angle of 5 degrees (see FIG. 9) and is made up of a series of plates 100 expanding in width from opening 75 to exit 88 until the last plate proximate exit 88 is 6 inches (15.2 cm) wider than the first plate at opening 75. Each of plates 100 is of constant thickness throughout its length from its rear edge 100A to its front edge 100B (see FIG. 9) and of constant thickness through its width. Except for the last plate 100 of bed 74 at exit 88, the front edge 100B of each plate 100 overlies the rear edge 100A of the plate immediately in front of that plate and is spaced from it by spacer blocks 102 supported by the rear edge 100A of each plate 100 to provide spaces 101.

Figure 14:
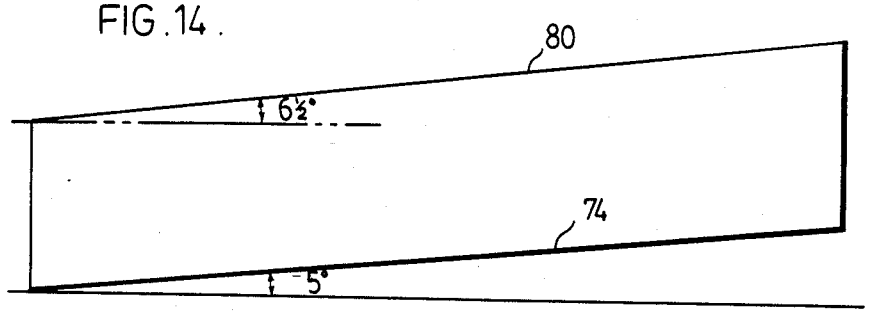
FIGS. 14 and 15 are schematics illustrating the disposition of the preheater.
Figure 15:
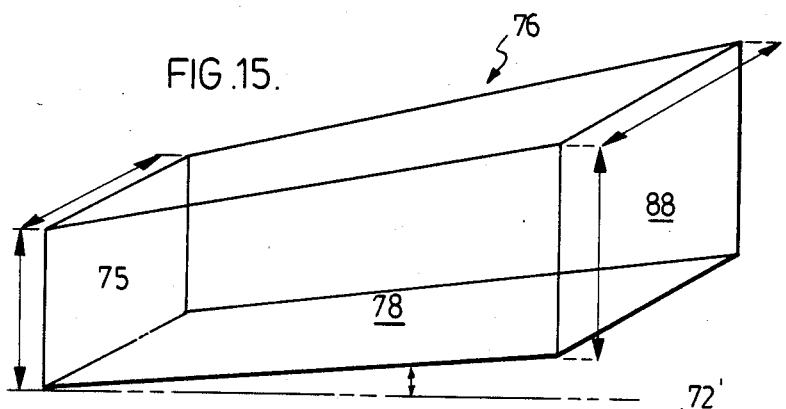

With reference to FIG. 14, to provide the enlarging dimensions of chamber 72, while bed 74 is angled at 5 degrees to the horizontal, top 80 is angled at 6½ degrees to the horizontal. In the same manner walls 76 and 78 diverge from opening 75 to exit 88. Furthermore, the spacing of walls 76 and 78 is increased from 4 feet 6 inches by 6 inches to 5 feet from opening 75 to exit 88. Their respective heights are also increased by 6 inches from 4 feet at opening 75 to 4 feet 6 inches at exit 88.

Figure 12:
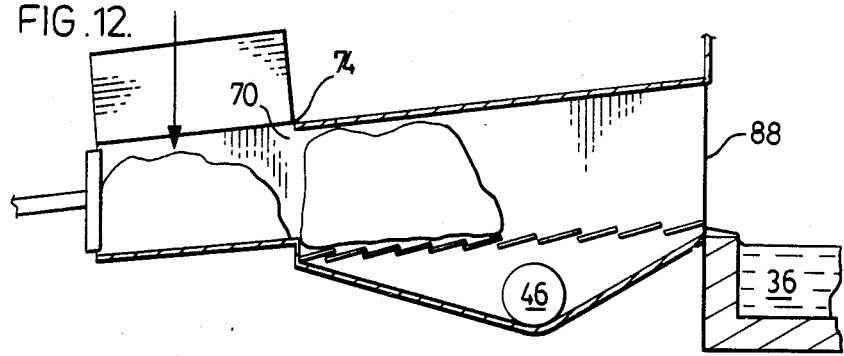
Figure 13:
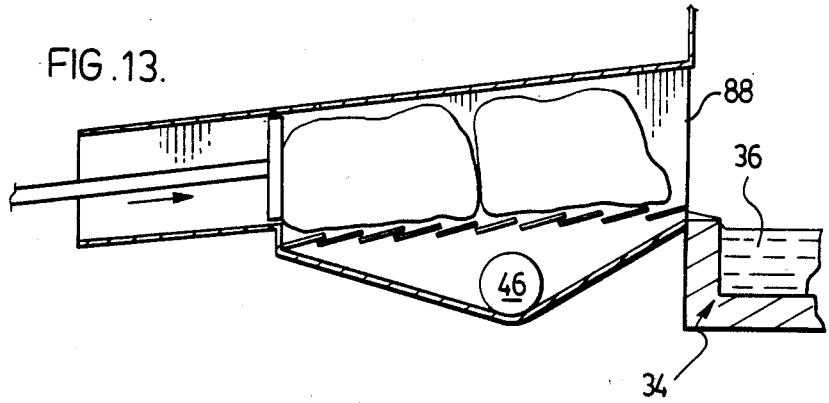

In the operation of preheater 32 the volume of charge box 52 is loaded with scrap aluminum (without comminuting or shredding) through top opening 56 after top 58 has been pivoted open and ram 68 retracted to close the end of box 52 remote opening 70 by discharging the contents of container 200 through top opening 56 (see FIGS. 2 and 3) into box 52. Thereafter, and with reference to FIGS. 10 through 14, as waste gas is brought in by tubing 46 into chamber 32A and thus through bed 74 of chamber 32, ram 68 is moved towards opening 70 of charge box 52 pushing the scrap through openings 70 and 75 into chamber 72 where the waste gases intoduced into lower chamber 32A pass through the openings 101 between plates 100, through the scrap 54 and out through hood 48 up stack 50. Because of the temperature of the waste gases (up to about 1,000 degrees F.) passing through the metal scrap, the heated metal expands and the water vaporizes or is otherwise dealt with (for example falling through the spaces 101 as a liquid stream from a block of ice). Thereafter, the ram or pusher 68 is retracted, more scrap is loaded into the charge box (see FIG. 12) and that load is pushed into the chamber (see FIG. 13). As the second load is pushed into chamber 72 the second load pushes the first load towards exit 88. As the scrap metal is pushed towards exit 88, because of the continuous enlarging of chamber 72 from opening 75 to exit 88, the expanding metal is permitted to move in a manner so that jamming of the scrap in the chamber or compression of pieces of metal (so as not to accidentally trap moisture between compressed pieces of metal) is precluded. After the second load is pushed into chamber 72, a third load is emptied into the charge box 52 and pusher 68 is activated to push the third load through openings 70 and 75 engaging the first two loads pushing the leading load through exit 88 into molten pool of metal 36 in well 34 below hood 42 where it changes to its molten state.

Figure 16:
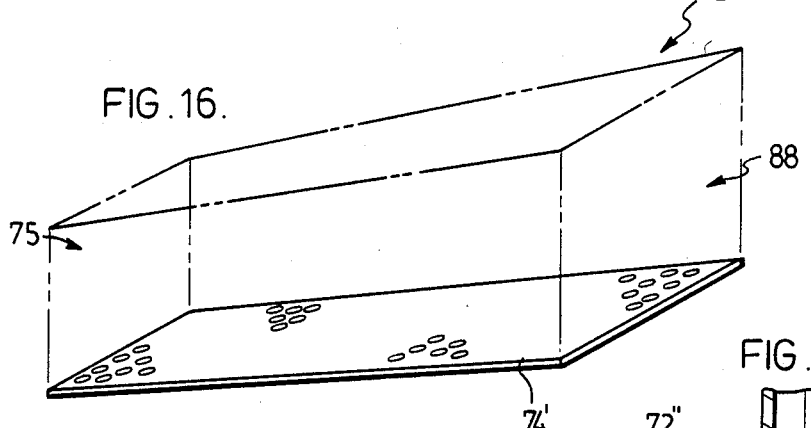
FIGS. 16 and 17 illustrate a number of different beds for the chamber of the preheater and their construction according to other embodiments of the invention.
Figure 17:
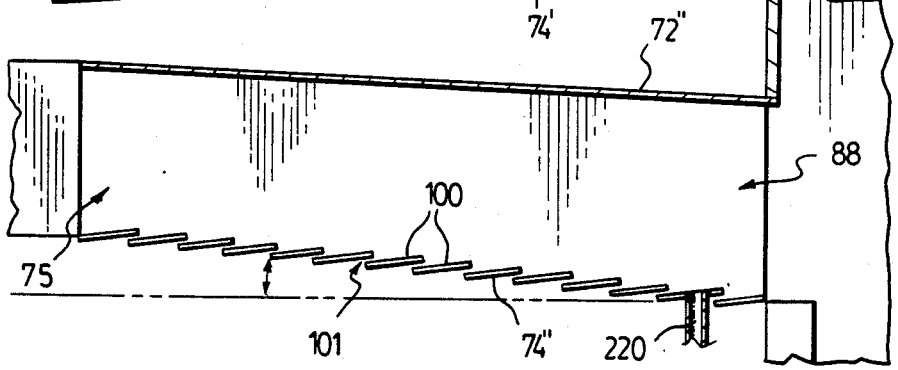

With reference to FIGS. 16 and 17, two alternately constructed chambers $72^1$ and $72^{11}$ are disclosed having different beds $74^1$ and $74^{11}$ respectively. With respect to FIG. 16, bed $74^1$ is an upwardly inclined flat metal plate from opening 75 to exit 88 of uniform thickness having apertures therethrough.

With respect to FIG. 17, while bed $74^{11}$ is made up of plates 100 overlying other plates and spaced therefrom, the plane of bed $74^{11}$ declines from opening 75 to exit 88 [although the chamber $72^{11}$ expands in its width and height (expanding dimensions)] at an angle of 6½ degrees while top 80 declines at an angle of 5 degrees, therefore enlarging the interior dimensions of the chamber from opening 75 to exit 88.

Where water melts from the scrap and falls onto bed $74^{11}$, unlike any water falling onto bed 74 or $74^1$ which will trickle to opening 75, water on bed $74^{11}$ if it does not fall between the spaces 101 between plates 100, will drop from plate to plate and (unless earlier vaporized) be collected in drain channel 220 and taken away from well 34.

As many changes can be made to the embodiments without departing from the scope of the invention, it is intended that all matter contained herein be interpreted as illustrative of the invention and not in a limiting sense.

The embodiments of the invention in which an exclusive privilege or property is claimed are as follows:

1. An improved preheater suitable for processing large pieces of scrap metal prior to being charged into a reverberatory furnace, the preheater comprising a charge box having a bottom for receiving scrap metal, a chamber having a bed, the chamber in communication with the charge box at one end and an exit at the other, a pusher for pushing the contents of the charge box into the chamber and thus pushing the contents of the chamber towards the exit, the chamber of uniform expanding dimensions from its one end in communication with the charge box towards the exit so as to permit the pushing of the scrap metal in the one direction away from the charge box to the exit without undue compression of the scrap metal or jamming of the scrap metal in the chamber, the bed having a plurality of openings therethrough for passing heated gases into the chamber for preheating the scrap and the bed being oriented from the charge box to the exit in a fixed position selected from a range of fixed positions between being fixed and being inclined slightly upwardly from the charge box to the exit to being fixed and being inclined slightly downwardly from the charge box to the exit and when the bed is fixed and inclined slightly downwardly from the charge box to the exit, the bed carries a drain between the charge box and exit proximate the exit for draining any water falling from the scrap to the bed from the chamber.

2. The preheater of claim 1, wherein the preheater is in communication with a gas fired reverberatory furnace and waste gases generated thereby are fed through the openings in the bed to circulate through the scrap metal.

3. The preheater of claim 2, wherein the chamber is rectangular in cross-section and uniformly expands in both height and width from the opening at the one end of the chamber in communication with the charge box, to the exit.

4. The preheater of claim 3, wherein the bed comprises a plurality of laterally extending plates, one in front of another, each plate having a front edge closer the exit and a rear edge closer the charge box, the front edge of the plate immediately behind the plate closer the exit, overlying the rear edge of the plate closer the exit and vertically spaced therefrom to provide a plurality of laterally extending openings through the bed.

5. The preheater of claim 2, wherein the bed comprises a plurality of laterally extending plates, one in front of another, each plate having a front edge closer the exit and a rear edge closer the charge box, the front edge of the plate immediately behind the plate closer the exit, overlying the rear edge of the plate closer the exit and vertically spaced therefrom to provide a plurality of laterally extending openings through the bed.

6. The preheater of claim 2, wherein the waste gases are injected through openings through the bed, and a gas chamber is provided below the bed for receiving the heated gases prior to their passage through the openings.

7. The preheater of claim 1, wherein the chamber is rectangular in cross-section and uniformly expands in both height and width from the opening at the one end of the chamber in communication with the charge box, to the exit.

8. The preheater of claim 7, wherein the bed comprises a plurality of laterally extending plates, one in front of another, each plate having a front edge closer the exit and a rear edge closer the charge box, the front edge of the plate immediately behind the plate closer the exit, overlying the rear edge of the plate closer the exit and vertically spaced therefrom to provide a plurality of laterally extending openings through the bed.

9. The preheater of claim 1, wherein the bed comprises a plurality of laterally extending plates, one in front of another, each plate having a front edge closer the exit and a rear edge closer the charge box, the front edge of the plate immediately behind the plate closer the exit, overlying the rear edge of the plate closer the exit and vertically spaced therefrom to provide a plurality of laterally extending openings through the bed.

* * * * *